(12) United States Patent
Ang

(10) Patent No.: US 7,755,213 B2
(45) Date of Patent: Jul. 13, 2010

(54) POWER SUPPLY DEVICE AND VEHICLE EQUIPPED WITH THE SAME

(75) Inventor: Wanleng Ang, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 232 days.

(21) Appl. No.: 12/086,121

(22) PCT Filed: Jun. 25, 2007

(86) PCT No.: PCT/JP2007/063190

§ 371 (c)(1),
(2), (4) Date: Jun. 5, 2008

(87) PCT Pub. No.: WO2008/015863

PCT Pub. Date: Feb. 7, 2008

(65) Prior Publication Data

US 2009/0160248 A1    Jun. 25, 2009

(30) Foreign Application Priority Data

Aug. 2, 2006   (JP) ............................. 2006-210828

(51) Int. Cl.
*B60L 11/18*  (2006.01)
*B60L 11/00*  (2006.01)
*B60L 15/00*  (2006.01)

(52) U.S. Cl. .................................................. 307/10.1
(58) Field of Classification Search ................. 307/10.1
See application file for complete search history.

(56) References Cited

U.S. PATENT DOCUMENTS

| 5,710,699 | A | * | 1/1998 | King et al. | ................. | 363/132 |
|---|---|---|---|---|---|---|
| 5,796,175 | A | * | 8/1998 | Itoh et al. | .................. | 307/10.1 |
| 6,608,396 | B2 | * | 8/2003 | Downer et al. | ............. | 290/40 C |
| 7,212,891 | B2 | * | 5/2007 | Sato | ............................. | 701/22 |
| 7,379,313 | B2 | * | 5/2008 | Yaguchi | ...................... | 363/98 |
| 7,423,391 | B2 | * | 9/2008 | Oyobe et al. | ................ | 318/139 |
| 7,486,034 | B2 | * | 2/2009 | Nakamura et al. | .......... | 318/139 |
| 2003/0107352 | A1 | | 6/2003 | Downer et al. | | |
| 2008/0204098 | A1 | * | 8/2008 | Qahouq et al. | ............. | 327/175 |
| 2009/0066277 | A1 | * | 3/2009 | Ang et al. | ............. | 318/400.17 |
| 2009/0067202 | A1 | * | 3/2009 | Ichikawa et al. | ............. | 363/79 |
| 2010/0038962 | A1 | * | 2/2010 | Komatsu | ................... | 307/10.1 |

FOREIGN PATENT DOCUMENTS

| JP | A 08-266059 | 10/1996 |
|---|---|---|
| JP | A 2002-44941 | 2/2002 |
| JP | A 2003-209969 | 7/2003 |
| JP | A 2005-151715 | 6/2005 |
| JP | A 2005-348548 | 12/2005 |

\* cited by examiner

*Primary Examiner*—Stephen W Jackson
*Assistant Examiner*—Adi Amrany
(74) *Attorney, Agent, or Firm*—Oliff & Berridge PLC

(57) ABSTRACT

A power supply device includes a current sensor detecting a current flowing between a junction, where an output of a first boost converter and an output of a second boost converter are joined together, and a load circuit, and a control device controlling the first and second boost converters and monitoring a current value detected by the current sensor. The control device performs pulse width modulation control over the first and second boost converters based on carrier signals equal in frequency and different in phase. The control device obtains an individual value of currents flowing through the first and second boost converters by sampling the detected current value with a time difference corresponding to phase difference.

12 Claims, 6 Drawing Sheets

POWER SUPPLY DEVICE AND VEHICLE EQUIPPED WITH THE SAME

TECHNICAL FIELD

The present invention relates to a power supply device and a vehicle equipped with the same, and more particularly to a power supply device having a plurality of voltage converters and a vehicle equipped with the same.

BACKGROUND ART

In recent years, environment-friendly vehicles, such as electric vehicles, fuel cell vehicles and hybrid vehicles employing both a motor and an engine, have received attention. It has been considered to mount a plurality of batteries on these vehicles where power supply devices are mounted.

Japanese Patent Laying-Open No. 2003-209969 discloses a power control system for an electric traction motor in a vehicle including: at least one inverter for providing conditioned electric power to the electric traction motor; a plurality of power stages for providing direct current (DC) power to the inverter, each stage having a battery and a boost/buck DC-DC converter and the power stages being wired in parallel; and a controller for controlling the plurality of power stages so that the batteries of the plurality of power stages are equally charged and discharged and the plurality of power stages maintain an output voltage to the inverter.

It is considered to mount a plurality of batteries of multiple kinds on a hybrid vehicle in order to maintain a maximum output and increase a distance traveled when the vehicle runs by using only electric power from the batteries. In this case, it is also contemplated to use a plurality of voltage converters.

Usually, however, current sensors should be installed for the plurality of converters respectively for independent current control over the converters. It is not preferable, however, to increase the number of the current sensors because the current sensors themselves are costly and maintaining reliability thereof also requires labor and cost.

DISCLOSURE OF THE INVENTION

An object of the present invention is to provide a power supply device having a plurality of voltage converters while suppressing an increase in the number of current sensors and a vehicle equipped with the same.

In summary, the present invention is directed to a power supply device including first and second power storage devices, a first voltage converter provided between the first power storage device and a load circuit, a second voltage converter provided between the second power storage device and the load circuit, a first current path connected to an output of the first voltage converter, a second current path connected to an output of the second voltage converter and connected to the first current path at a junction, a third current path connected between the junction and the load circuit, a current sensor detecting a current flowing through the third current path, and a control device controlling the first and second voltage converters and monitoring a current value detected by the current sensor. The control device performs pulse width modulation control over the first and second voltage converters based on first and second carrier signals equal in frequency and different in phase. The control device obtains an individual value of currents flowing through the first and second voltage converters by sampling the detected current value with a time difference corresponding to phase difference.

Preferably, the control device includes a signal generating portion generating the first carrier signal, a first modulating portion generating a first drive signal supplied to the first voltage converter based on a first command value and the first carrier signal, a phase changing portion adding the phase different to the first carrier signal and outputting the second carrier signal, and a second modulating portion generating a second drive signal supplied to the second voltage converter based on a second command value and the second carrier signal.

More preferably, the phase difference is 180°.

Preferably, the phase changing portion adjusts the phase difference such that a timing of rising of the second drive signal matches a timing of falling of the first drive signal.

Preferably, the power supply device further includes a capacitor having one end connected to a connection point on the third current path, for smoothing an output from the first voltage converter and an output from the second voltage converter and supplying the outputs to the load circuit. The current sensor detects a current flowing between the junction of the third current path and the connection point.

Preferably, each of the first and second voltage converters includes a chopper circuit.

In another aspect, the present invention is directed to a vehicle having any of the above-described power supply devices and an inverter driving a motor for driving wheels. The load circuit includes the inverter.

According to the present invention, an increase in the number of the current sensors can be suppressed when the power supply device having the plurality of voltage converters is implemented.

BEST MODES FOR CARRYING OUT THE INVENTION

The embodiments of the present invention will be described below in detail with reference to the drawings, in which the same or corresponding parts are represented by the same reference numbers, and the description thereof will not be repeated.

First Embodiment

Figure 1:
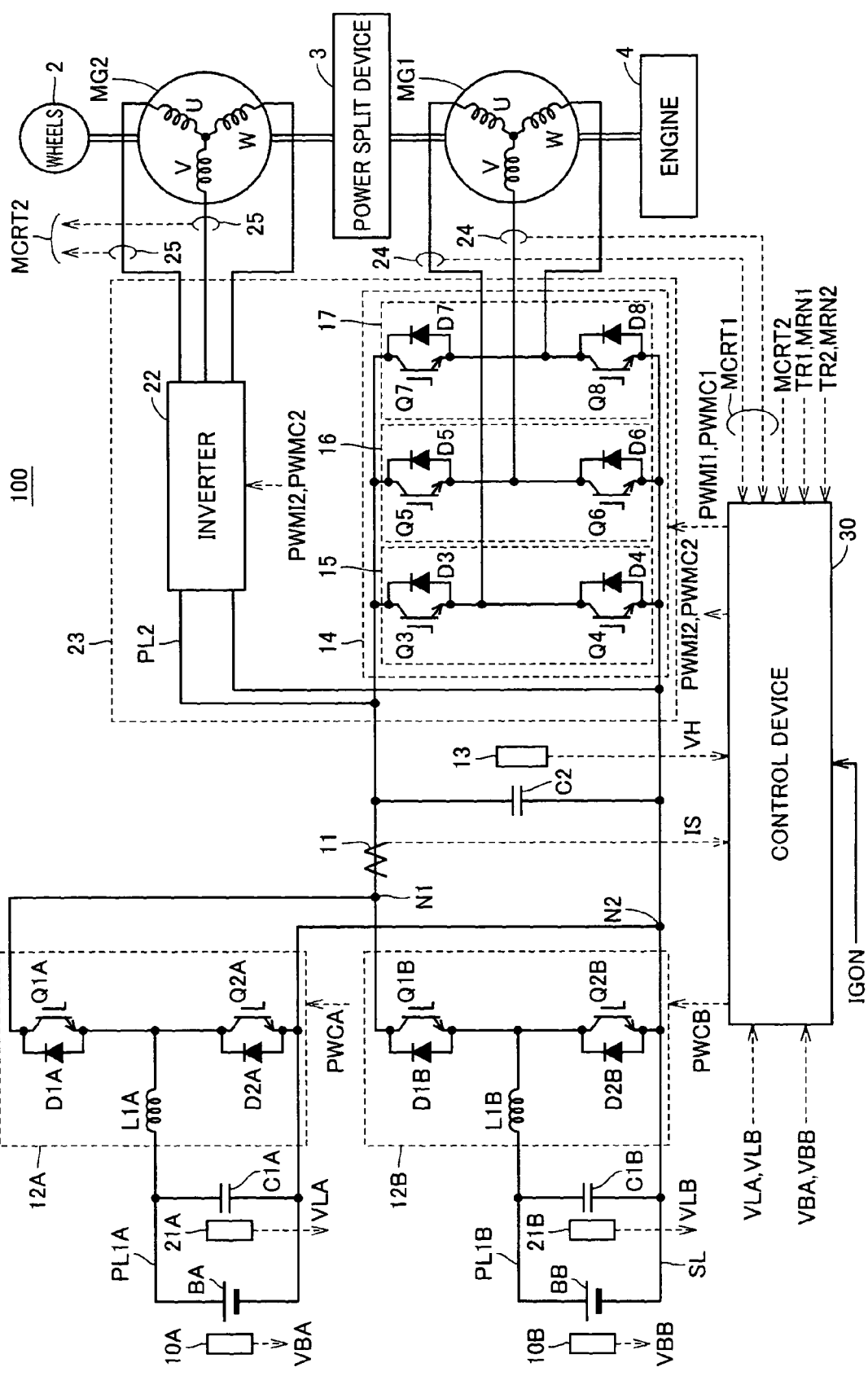
FIG. 1 is a diagram of a main configuration of a vehicle 100 of a first embodiment of the present invention.

FIG. 1 is a diagram of a main configuration of a vehicle 100 of a first embodiment of the present invention. Although vehicle 100 is a hybrid vehicle employing both a motor and an engine to drive the vehicle, the present invention can also be applied to an electric vehicle whose wheels are driven by a motor, a fuel cell vehicle or the like.

Referring to FIG. 1, vehicle 100 includes batteries BA and BB, boost converters 12A and 12B, smoothing capacitors C1A, C1B and C2, voltage sensors 13, 21A and 21B, a load circuit 23, an engine 4, motor generators MG1 and MG2, a power split device 3, wheels 2, and a control device 30.

Vehicle 100 further includes power supply lines PL1A, PL1B and PL2, a ground line SL, a voltage sensor 10A detecting a voltage VBA across terminals of battery BA, and a voltage sensor 10B detecting a voltage VBB across terminals of battery BB.

For example, a secondary battery such as a lead-acid battery, a nickel-metal-hydride battery or a lithium-ion battery can be used as batteries BA and BB.

Capacitor C1A smoothes the voltage across the terminals of battery BA. Capacitor C1A is connected between power supply line PL1A and ground line SL. Capacitor C1B smoothes the voltage across the terminals of battery BB. Capacitor C1B is connected between power supply line PL1B and ground line SL.

Voltage sensor 21A senses a voltage VLA across opposing ends of capacitor C1A and outputs the sensed voltage to control device 30. Boost converter 12A boosts the voltage across terminals of capacitor CIA. Voltage sensor 21B senses a voltage VLB across opposing ends of capacitor C1B and outputs the sensed voltage to control device 30. Boost converter 12B boosts the voltage across terminals of capacitor C1B.

Capacitor C2 smoothes the voltage boosted by one or both of boost converters 12A and 12B. Voltage sensor 13 senses a voltage VH across terminals of smoothing capacitor C2 and outputs the sensed voltage to control device 30.

Load circuit 23 includes inverters 14 and 22. Inverter 14 converts a DC voltage provided from boost converters 12 into a three-phase alternating current (AC) and outputs the converted AC to motor generator MG1.

Power split device 3 is a device that is coupled to engine 4 and motor generators MG1 and MG2 to distribute mechanical power therebetween. For example, a planetary gear mechanism having three rotation shafts of a sun gear, a planetary carrier and a ring gear can be used as the power split device. These three rotation shafts are connected to rotation shafts of engine 4 and motor generators MG1 and MG2 respectively.

It should be noted that the rotation shaft of motor generator MG2 is coupled to wheels 2 through a reduction gear and a differential gear that are not shown. A decelerator for the rotation shaft of motor generator MG2 may further be incorporated into power split device 3. This decelerator may be configured such that its reduction gear ratio is switchable.

Boost converter 12A includes a reactor L1A having one end connected to power supply line PL1A, IGBT elements Q1A and Q2A connected in series between power supply line PL2 and ground line SL, and diodes D1A and D2A connected in parallel to IGBT elements Q1A and Q2A respectively.

Reactor L1A has the other end connected to an emitter of IGBT element Q1A and a collector of IGBT element Q2A. A cathode of diode D1A is connected to a collector of IGBT element Q1A, and an anode of diode D1A is connected to the emitter of IGBT element Q1A. A cathode of diode D2A is connected to the collector of IGBT element Q2A, and an anode of diode D2A is connected to an emitter of IGBT element Q2A.

Boost converter 12B includes a reactor L1B having one end connected to power supply line PL1B, IGBT elements Q1B and Q2B connected in series between power supply line PL2 and ground line SL, and diodes D1B and D2B connected in parallel to IGBT elements Q1B and Q2B respectively.

Reactor L1B has the other end connected to an emitter of IGBT element Q1B and a collector of IGBT element Q2B. A cathode of diode D1B is connected to a collector of IGBT element Q1B, and an anode of diode D1B is connected to the emitter of IGBT element Q1B. A cathode of diode D2B is connected to the collector of IGBT element Q2B, and an anode of diode D2B is connected to an emitter of IGBT element Q2B.

Inverter 14 receives the boosted voltage from boost converters 12A and 12B and drives motor generator MG1, for example, for starting engine 4. Furthermore, inverter 14 returns electric power generated at motor generator MG1 by using mechanical power transmitted from engine 4 back to boost converter 12A or 12B. Here, boost converter 12A or 12B is controlled by control device 30 to operate as a step-down circuit.

Inverter 14 includes a U-phase arm 15, a V-phase arm 16 and a W-phase arm 17. U-phase arm 15, V-phase arm 16 and W-phase arm 17 are connected in parallel between power supply line PL2 and ground line SL.

U-phase arm 15 includes IGBT elements Q3 and Q4 connected in series between power supply line PL2 and ground line SL, and diodes D3 and D4 connected in parallel to IGBT elements Q3 and Q4 respectively. A cathode of diode D3 is connected to a collector of IGBT element Q3, and an anode of diode D3 is connected to an emitter of IGBT element Q3. A cathode of diode D4 is connected to a collector of IGBT element Q4, and an anode of diode D4 is connected to an emitter of IGBT element Q4.

V-phase arm 16 includes IGBT elements Q5 and Q6 connected in series between power supply line PL2 and ground line SL, and diodes D5 and D6 connected in parallel to IGBT elements Q5 and Q6 respectively. A cathode of diode D5 is connected to a collector of IGBT element Q5, and an anode of diode D5 is connected to an emitter of IGBT element Q5. A cathode of diode D6 is connected to a collector of IGBT element Q6, and an anode of diode D6 is connected to an emitter of IGBT element Q6.

W-phase arm 17 includes IGBT elements Q7 and Q8 connected in series between power supply line PL2 and ground line SL, and diodes D7 and D8 connected in parallel to IGBT elements Q7 and Q8 respectively. A cathode of diode D7 is connected to a collector of IGBT element Q7, and an anode of diode D7 is connected to an emitter of IGBT element Q7. A cathode of diode D8 is connected to a collector of IGBT element Q8, and an anode of diode D8 is connected to an emitter of IGBT element Q8.

An intermediate point of the arm of each phase is connected to one end of a coil of each phase of motor generator MG1. That is, motor generator MG1 is a three-phase permanent magnet synchronous motor, and three coils of the U, V and W-phases have respective one ends connected at a midpoint in common. The U-phase coil has the other end connected to a connection node of IGBT elements Q3 and Q4. The V-phase coil has the other end connected to a connection node of IGBT elements Q5 and Q6. The W-phase coil has the other end connected to a connection node of IGBT elements Q7 and Q8.

It should be noted that other electric power switching elements such as a power MOSFET may be used instead of above-described IGBT elements Q1A, Q2A, Q1B, Q2B, and Q3-Q8.

Current sensor 24 detects a current flowing to motor generator MG1 as a motor current value MCRT1 and outputs motor current value MCRT1 to control device 30.

Inverter 22 is connected to power supply line PL2 and ground line SL. Inverter 22 converts a DC voltage output from boost converters 12A and 12B into a three-phase AC and outputs the converted AC to motor generator MG2 that drives wheels 2. Furthermore, inverter 22 returns electric power generated at motor generator MG2 back to boost converters 12A and 12B during regenerative braking. Here, boost converters 12A and 12B are controlled by control device 30 to operate as step-down circuits. Although an internal configuration of inverter 22 is not shown, it is the same as that of inverter 14 and the detailed description thereof will not be repeated.

Control device 30 receives torque command values TR1 and TR2, the rotation speed of motors MRN1 and MRN2, each value of voltages VB and VH and a current IB, motor current values MCRT1 and MCRT2, and a startup instruction IGON. Control device 30 outputs signals PWCA and PWCB providing an instruction for boosting, an instruction for stepping down and an instruction for prohibiting an operation to boost converters 12A and 12B.

In addition, control device 30 outputs a drive instruction PWMI1 and a regeneration instruction PWMC1 to inverter 14. Drive instruction PWMI1 is an instruction for converting a DC voltage that is an output of boost converters 12A and 12B into an AC voltage for driving motor generator MG1. Regeneration instruction PWMC1 is an instruction for converting an AC voltage generated at motor generator MG1 into a DC voltage to return the converted voltage back to a side of boost converters 12A and 12B.

Similarly, control device 30 outputs a drive instruction PWMI2 and a regeneration instruction PWMC2 to inverter 22. Drive instruction PWMI2 is an instruction for converting a DC voltage into an AC voltage for driving motor generator MG2. Regeneration instruction PWMC2 is an instruction for converting an AC voltage generated at motor generator MG2 into a DC voltage to return the converted voltage back to a side of boost converters 12A and 12B.

The present embodiment will be described comprehensively with reference to FIG. 1. The power supply device according to the present embodiment includes batteries BA and BB, boost converter 12A provided between battery BA and load circuit 23, boost converter 12B provided between battery BB and load circuit 23, a first current path connected to the output of boost converter 12A, a second current path connected to the output of boost converter 12B and connected to the first current path at a junction N1, a third current path connected between junction N1 and load circuit 23, a current sensor 11 detecting a current flowing through the third current path, and control device 30 controlling boost converters 12A and 12B and monitoring a current value detected by current sensor 11. By joining the first to the third current paths together, power supply line PL2 is formed. Control device 30 performs pulse width modulation control over boost converters 12A and 12B based on carrier signals FCA and FCB equal in frequency and different in phase as will be shown later in FIG. 3. Control device 30 obtains an individual value of currents flowing through boost converters 12A and 12B by sampling the detected current value with a time difference corresponding to phase difference.

Preferably, the power supply device further includes capacitor C2 having one end connected to a connection point on the third current path, for smoothing an output from boost converter 12A and an output from boost converter 12B and supplying the outputs to load circuit 23. Current sensor 11 detects a current flowing between junction N1 of the third current path and the connection point of capacitor C2.

Preferably, each of boost converters 12A and 12B includes a chopper circuit.

Figure 2:
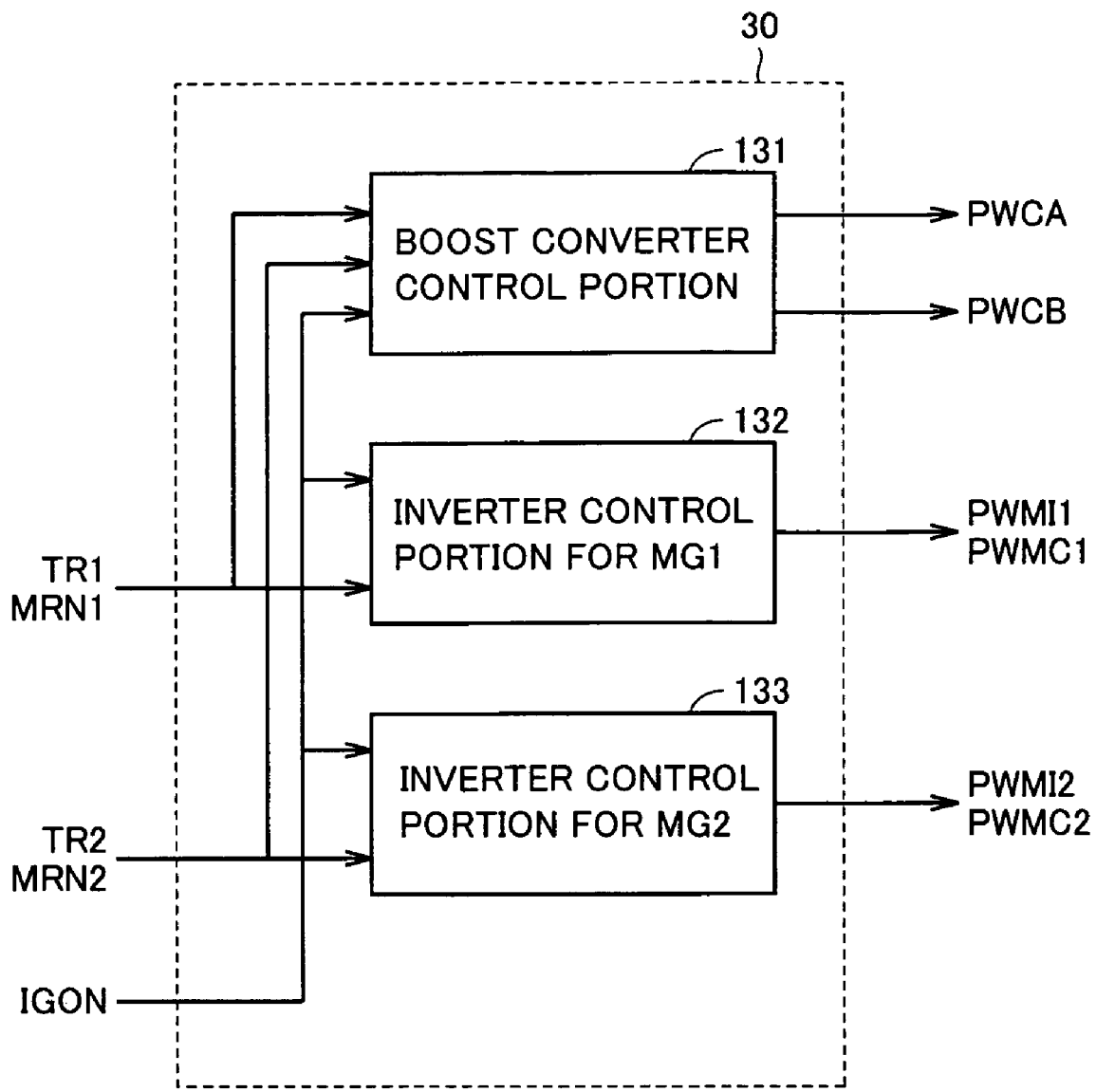
FIG. 2 is a functional block diagram of a control device 30 in FIG. 1.

FIG. 2 is a functional block diagram of control device 30 in FIG. 1. It should be noted that this control device 30 can be implemented by any of software and hardware.

Referring to FIGS. 1 and 2, control device 30 includes a boost converter control portion 131 controlling boost converters 12A and 12B, an inverter control portion 132 for MG1 controlling motor generator MG1, and an inverter control portion 133 for MG2 controlling motor generator MG2.

In response to startup instruction IGON, boost converter control portion 131 permits boosting operation. Drive signals PWCA and PWCB for issuing an instruction for boosting and an instruction for stepping down are output from boost converter control portion 131 to boost converters 12A and 12B in FIG. 1 respectively. Inverter control portion 132 for MG1 outputs drive instruction PWMI1 and regeneration instruction PWMC1 to inverter 14 based on torque command value TR1 and the rotation speed of the motor MRN1. Inverter control portion 133 for MG2 outputs drive instruction PWMI2 and regeneration instruction PWMC2 to inverter 22 based on torque command value TR2 and the rotation speed of the motor MRN2.

Figure 3:
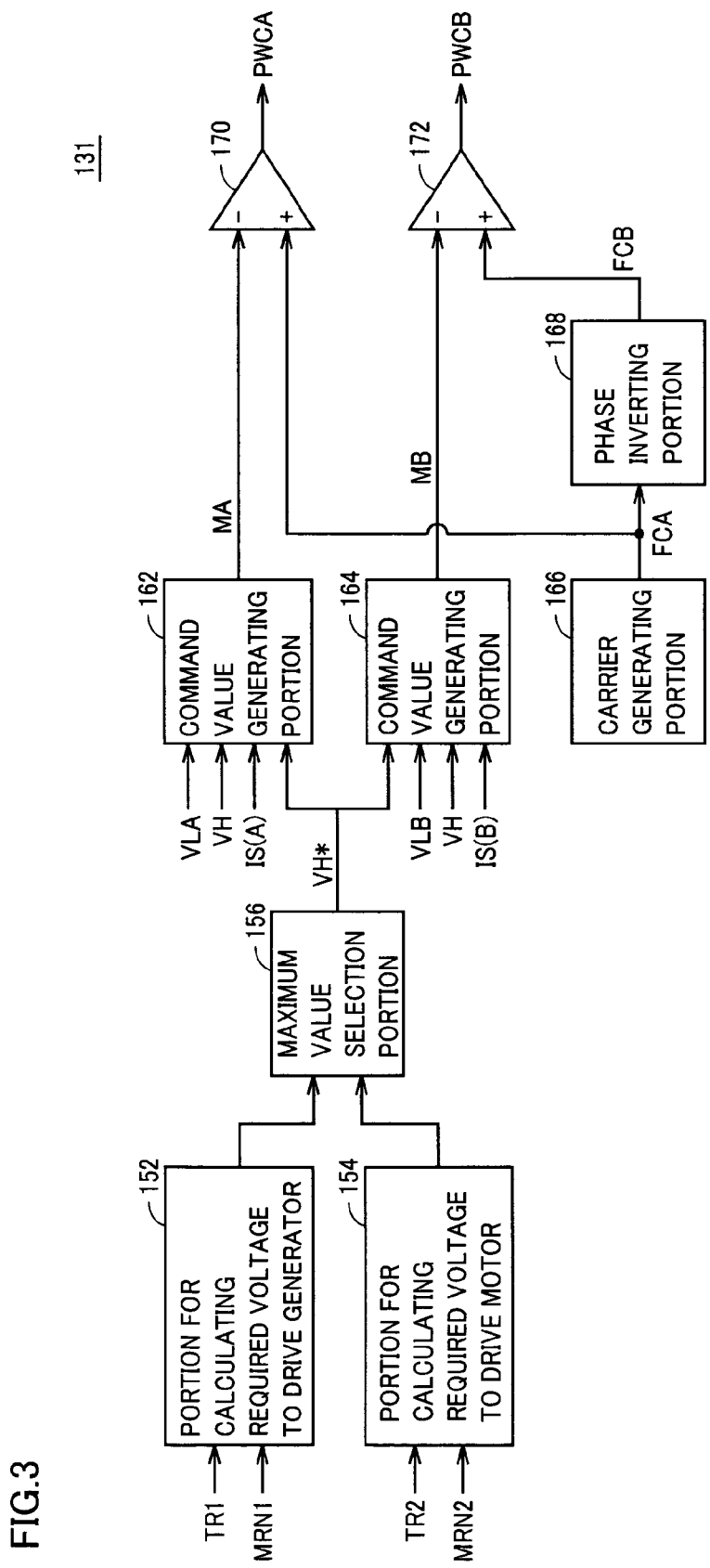
FIG. 3 is a functional block diagram for explaining a configuration of a boost converter control portion 131 in FIG. 2.

FIG. 3 is a functional block diagram for explaining a configuration of boost converter control portion 131 in FIG. 2. It should be noted that this boost converter control portion 131 can be implemented by any of software and hardware.

Referring to FIG. 3, boost converter control portion 131 includes a portion for calculating a required voltage to drive a generator 152, a portion for calculating a required voltage to drive a motor 154, and a maximum value selection portion 156.

Portion for calculating a required voltage to drive a generator 152 calculates a required voltage of motor generator MG1 based on torque command value TR1 and the rotation speed MRN1. This required voltage is higher than an induced voltage generated by revolutions of motor generator MG1.

Portion for calculating a required voltage to drive a motor 154 calculates a required voltage of motor generator MG2 based on torque command value TR2 and the rotation speed MRN2. This required voltage is higher than an induced voltage generated by revolutions of motor generator MG2.

Maximum value selection portion 156 selects a maximum value from the required voltages calculated by portion for calculating a required voltage to drive a generator 152 and portion for calculating a required voltage to drive a motor 154 and outputs a target value VH* of voltage VH. As a result, a loss can be suppressed by performing field-weakening control as little as possible and a large output can be obtained.

Boost converter control portion 131 further includes command value generating portions 162 and 164.

Command value generating portion 162 generates a command value MA corresponding to boost converter 12A based on target voltage value VH* and voltages VLA, VH and/or a current IS(A). Command value generating portion 164 generates a command value MB corresponding to boost converter 12B based on voltages VLB, VH and/or a current IS(B). It should be noted that command value generating portions 162 and 164 operate in a current control mode where control is exercised by setting an input current of a corresponding boost converter to a target value or in a voltage control mode where control is exercised by setting an output voltage to a target value, and they can generate command values MA and MB respectively.

For example, command value generating portion 162 can generate command value MA based on current IS(A) so that current IS(A) supplied from battery BA to boost converter 12A is controlled to a prescribed target value. Command value generating portion 164 can generate command value MB based on voltages VLB, VH and target value VH* so that voltage VH is controlled to a prescribed target value. Conversely, command value generating portion 162 may be controlled to operate in the voltage control mode and command value generating portion 164 may be controlled to operate in the current control mode.

Boost converter control portion 131 further includes a carrier generating portion 166 generating carrier signal FCA, a modulating portion 170 generating drive signal PWCA to boost converter 12A based on command value MA and carrier signal FCA, a phase inverting portion 168 that is a phase changing portion changing a phase of carrier signal FCA and outputting carrier signal FCB, and a modulating portion 172 generating drive signal PWCB to boost converter 12B based on command value MB and carrier signal FCB.

It should be noted that the phase difference achieved by phase inverting portion 168 is 180°.

Carrier generating portion 166 generates carrier signal FCA for generating a PWM signal. Carrier signal FCA has a triangular wave and a cycle thereof is set in consideration of a switching loss of boost converters 12A and 12B.

Phase inverting portion 168 receives carrier signal FCA from carrier generating portion 166 and outputs carrier signal FCB that is phase-shifted by 180° with respect to carrier signal FCA.

Modulating portion 170 can be implemented by a comparator. Modulating portion 170 compares command value MA from command value generating portion 162 with carrier signal FCA from carrier generating portion 166 to generate signal PWCA that changes according to whether command value MA is larger or smaller than carrier signal FCA. Modulating portion 172 can also be implemented by a comparator in a similar manner. Modulating portion 172 compares command value MB from command value generating portion 164 with carrier signal FCB from phase inverting portion 168 to generate signal PWCB that changes according to whether command value MB is larger or smaller than carrier signal FCB.

In this boost converter control portion 131, signal PWCA is generated based on carrier signal FCA, and signal PWCB is generated based on carrier signal FCB that is phase-shifted by 180° with respect to carrier signal FCA. As a result, a ripple of an output current of boost converter 12B is 180° out of phase with respect to a ripple of an output current of boost converter 12A.

Consequently, capacitor C2 can have a long life. In addition, the capacity (size) required by capacitor C2 can be reduced. Furthermore, noise from overall boost converters 12A and 12B can be reduced because a phase of an acoustic wave generated from boost converters 12A and 12B is also inverted.

In addition, regarding measurement of a current, there is an advantage described below.

Figure 4:
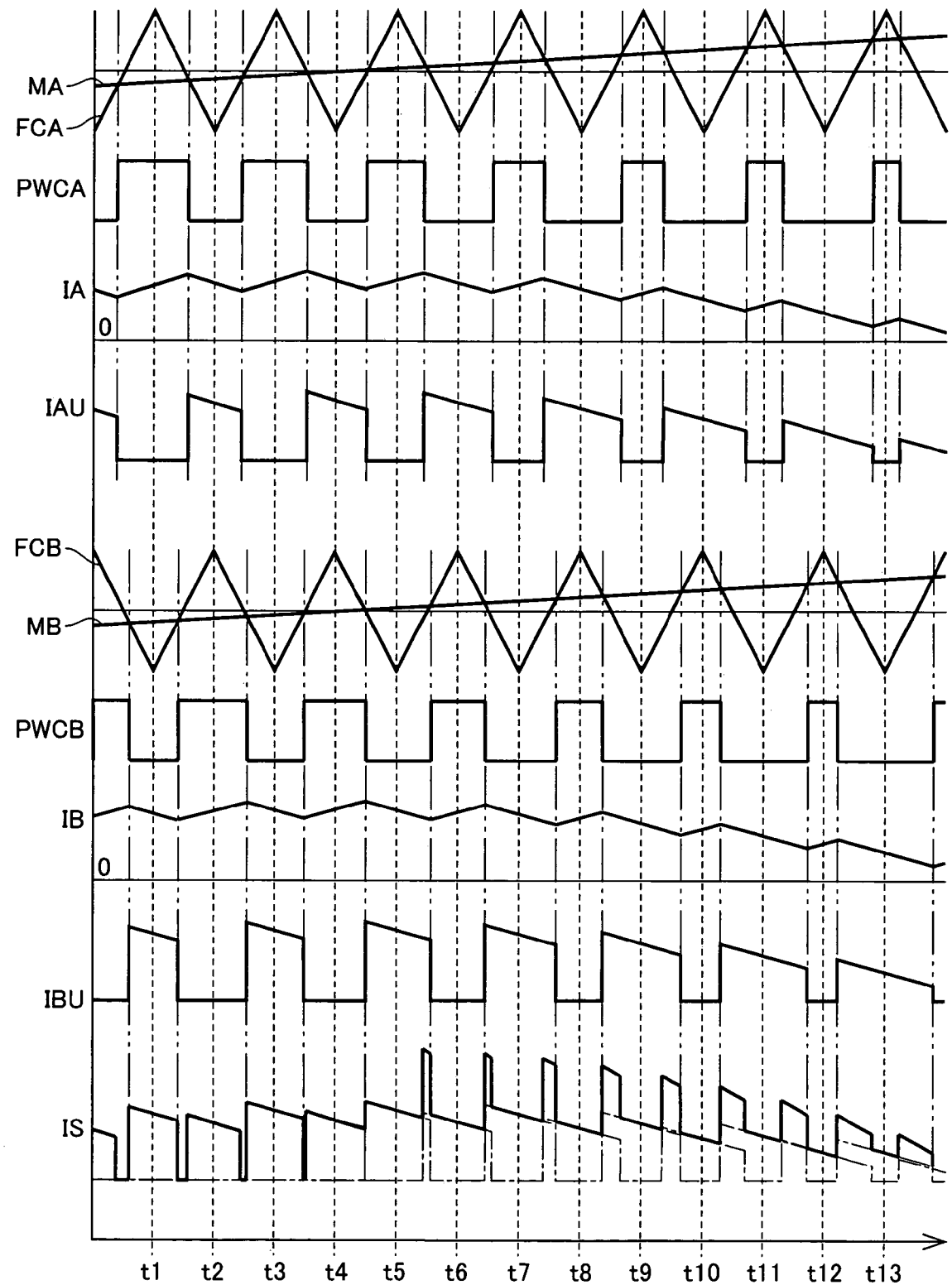
FIG. 4 is a diagram of operating waveforms related to control of the boost converter.

FIG. 4 is a diagram of operating waveforms related to control of the boost converters.

Referring to FIGS. 3 and 4, carrier signal FCA generated by carrier generating portion 166 has a triangular wave. Carrier signal FCB output by phase inverting portion 168 has a triangular wave, whose frequency is equal to that of carrier signal FCA and whose phase is shifted by 180°. FIG. 4 shows, by way of example, a case where both of command values MA and MB slowly increase.

Signal PWCA is set to HIGH level when carrier signal FCA>command value MA, and otherwise it is set to LOW level. In the boost control, this time period when signal PWCA is set to the HIGH level corresponds to the time when IGBT element Q2A is conducting. A current IA flowing through reactor L1A in FIG. 1 increases when signal PWCA is set to the HIGH level and decreases when signal PWCA is set to the LOW level.

If the duty ratio of signal PWCA is 50%, current IA is approximately constant because increment and decrement in current IA that are repeated are substantially equal to each other. If the duty ratio of signal PWCA is less than 50%, current IA gradually decreases because the decrement is larger than the increment as shown from t5 and later in the drawing. Conversely, if the duty ratio of signal PWCA is larger than 50%, current IA gradually increases because the increment is larger than the decrement as shown from t5 and later in the drawing.

The description for signal PWCA and current IA above is similarly applicable to signal PWCB and a current IB flowing through reactor L1B, although they are different in that the phase of carrier signal FCB is inverted. Therefore, the description above will not be repeated.

When signal PWCA is set to the LOW level, IGBT element Q2A is set to an OFF state and energy stored in reactor L1A flows through diode D1A to power supply line PL2. This current component is detected by current sensor 11. A current IAU in FIG. 4 refers to this current component, that is, a current flowing through an upper arm of boost converter 12A.

Similarly, when signal PWCB is set to the LOW level, IGBT element Q2B is set to an OFF state and energy stored in reactor LIB flows through diode D1B to power supply line PL2. This current component is detected by current sensor 11. Current IBU in FIG. 4 refers to this current component, that is, a current flowing through an upper arm of boost converter 12B.

Therefore, a current IS detected by current sensor 11 indicates a sum of current IAU and current IBU.

As can be seen from FIG. 4, a value of current IS is equal to a value of current IBU at times t1, t3, t5, t7, t9, t11, and t13. A value of current IS is equal to a value of current IAU at times t2, t4, t6, t8, t10, and t12.

That is, when a detected value of current sensor 11 is sampled at points (t2, t4 . . . ) where carrier signal FCA is lowest, a current value of boost converter 12A can be obtained. When a detected value of current sensor 11 is sampled at points (t1, t3 . . . ) where carrier signal FCB is lowest, a current value of boost converter 12B can be obtained.

Therefore, control device 30 in FIG. 1 can obtain current values of two boost converters 12A and 12B by sampling detected values of current sensor 11 based on carrier signals FCA and FCB. For example, if control device 30 is implemented by a microcomputer, control device 30 may receive an output of current sensor 11 at a built-in A/D converter or an external A/D converter, shift the timing in accordance with a phase difference in a carrier frequency and perform sampling.

Thus, in the first embodiment, one current sensor is provided closer to the load circuit than the junctions of the current paths extending from two voltage converters toward the load circuit and two current values can be read from one current sensor by controlling the carrier signals for driving two voltage converters such that they are shifted and by sampling an output of the current sensor with a time difference in accordance with the shift between the carrier signals.

As a result, the number of the current sensors can be reduced. Therefore, the cost of the current sensors and the cost of maintaining the reliability of the current sensors (detection of a failure or the like) can be reduced.

In addition, there is also an advantage that the operation load imposed on a CPU is reduced because a total current (that should be monitored in order to prevent overcurrent in the system or the like) calculated as a result of the operation by the CPU or the like when a current sensor is provided for each converter can be read directly.

Second Embodiment

Although the carrier signal is shifted by 180° in the first embodiment, it may be shifted by any angle other than 180°.

Figure 5:
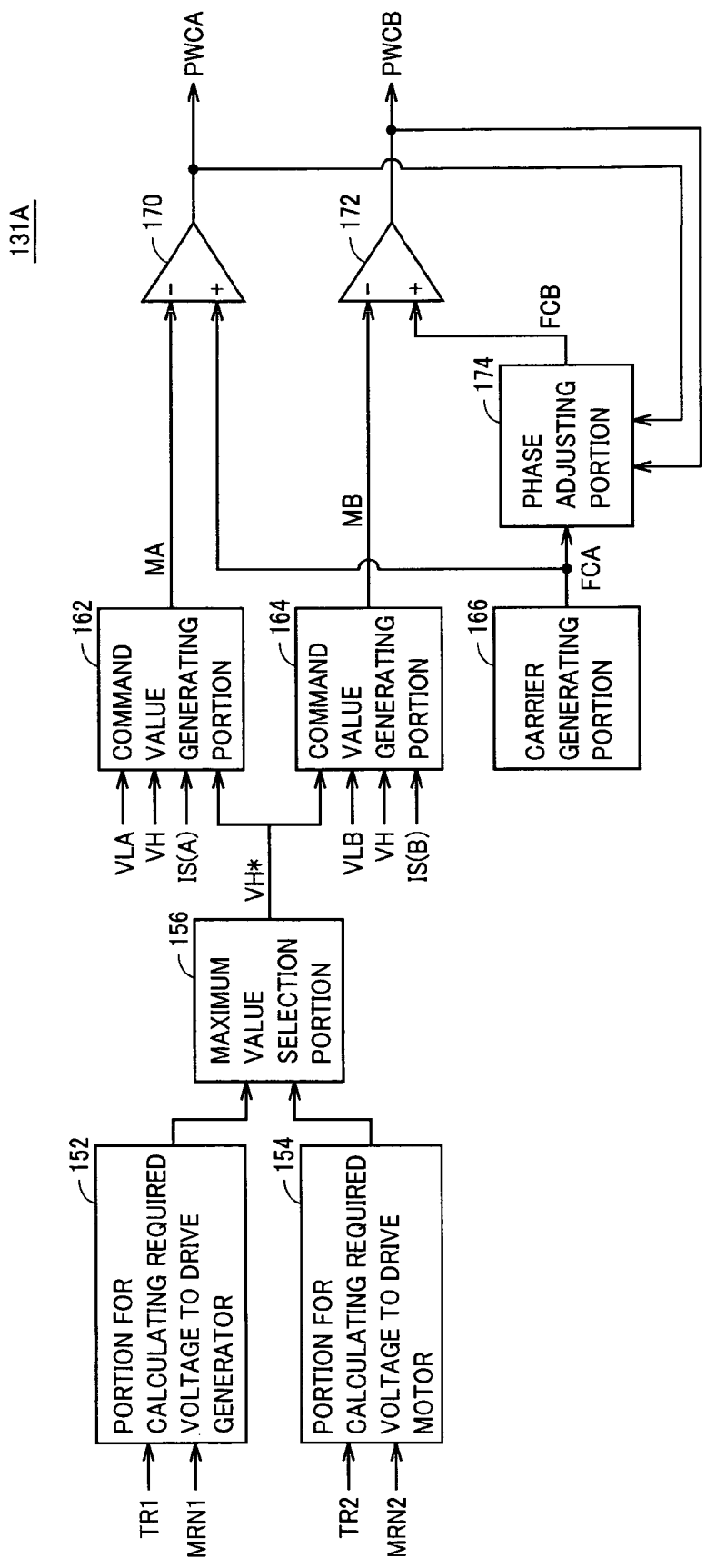
FIG. 5 is a functional block diagram of a modification of the boost converter control portion in FIG. 3.

FIG. 5 is a functional block diagram of a modification of the boost converter control portion in FIG. 3.

Referring to FIG. 5, a boost converter control portion 131A includes portion for calculating a required voltage to drive a generator 152, portion for calculating a required voltage to drive a motor 154, maximum value selection portion 156, and command value generating portions 162 and 164. As the operation of these components is similar to that of FIG. 3, the description thereof will not be repeated.

Boost converter control portion 131A further includes carrier generating portion 166 generating carrier signal FCA, modulating portion 170 generating drive signal PWCA to boost converter 12A based on command value MA and carrier signal FCA, a phase adjusting portion 174 that is a phase changing portion changing a phase of carrier signal FCA and outputting carrier signal FCB, and modulating portion 172 generating drive signal PWCB to boost converter 12B based on command value MB and carrier signal FCB.

Phase adjusting portion 174 adjusts the phase difference so that a timing of rising of drive signal PWCB matches a timing of falling of drive signal PWCA.

As modulating portions 170 and 172 operate as in FIG. 3, the description thereof will not be repeated.

In boost converter control portion 131A, carrier signal FCB is phase-adjusted with respect to carrier signal FCA so that a timing of rising of signal PWCB is synchronized with a timing of falling of signal PWCA. As a result, a ripple of an output current of converter 12B is out of phase with respect to a ripple of an output current of boost converter 12A, and a ripple current from converter 12A and a ripple current from converter 12B are continuous in part.

Figure 6:
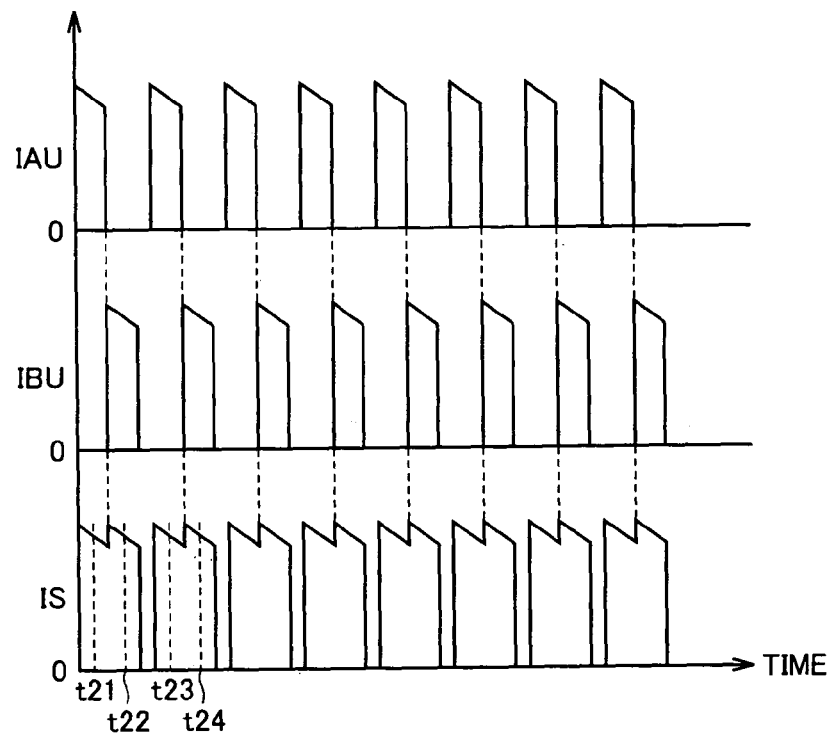
FIG. 6 is a waveform diagram of output currents of boost converters 12A and 12B in a second embodiment.

FIG. 6 is a waveform diagram of output currents of boost converters 12A and 12B in a second embodiment.

Referring to FIGS. 1 and 6, currents IAU and IBU indicate output currents from the upper arms of boost converters 12A and 12B respectively. Current IS indicates a sum of currents IAU and IBU detected by current sensor 11, that is, a total current supplied from two boost converters 12A and 12B to capacitor C2.

As described above, a timing of rising of current IBU is synchronized with a timing of falling of current IAU by synchronizing a timing of rising of signal PWCB with a timing of falling of signal PWCA. Therefore, current IBU flows continuously after current IAU flows. As a result, if command values MA and MB are small, a ripple frequency of total current IS is reduced by half as compared to that of the first embodiment shown in FIG. 4.

Although the phase difference between carrier signals FCA and FCB is adjusted so that a timing of rising of signal PWCB is synchronized with a timing of falling of signal PWCA in the foregoing, the phase difference between carrier signals FCA and FCB may be adjusted so that a timing of rising of signal PWCA is synchronized with a timing of falling of signal PWCB.

When a current value detected by current sensor 11 is sampled in accordance with this amount of adjustment, a current value of boost converter 12A and a current value of boost converter 12B can be obtained by using one current sensor. That is, in FIG. 6, a value of current IAU of boost converter 12A can be detected by reading current IS at times t21 and t23. In addition, a value of current IBU of boost converter 12B can be detected by reading current IS at times t22 and t24.

As described above, in this second embodiment, a current of boost converter 12A and a current from boost converter 12B are made continuous in part at capacitor C2 because the phase difference between carrier signals FCA and FCB is adjusted so that a timing of rising of signal PWCB is synchronized with a timing of falling of signal PWCA. As a result, an effect that the ripple frequency of total current IS is reduced by half as compared to that of the first embodiment is also obtained in addition to the effect obtained in the first embodiment.

Third Embodiment

Although the current sensor is provided on the power supply line in FIG. 1, it may be provided on the ground line. In this case, though the current sensor may be implemented by a hall element, use of a shunt resistor is highly advantageous in terms of cost.

Figure 7:
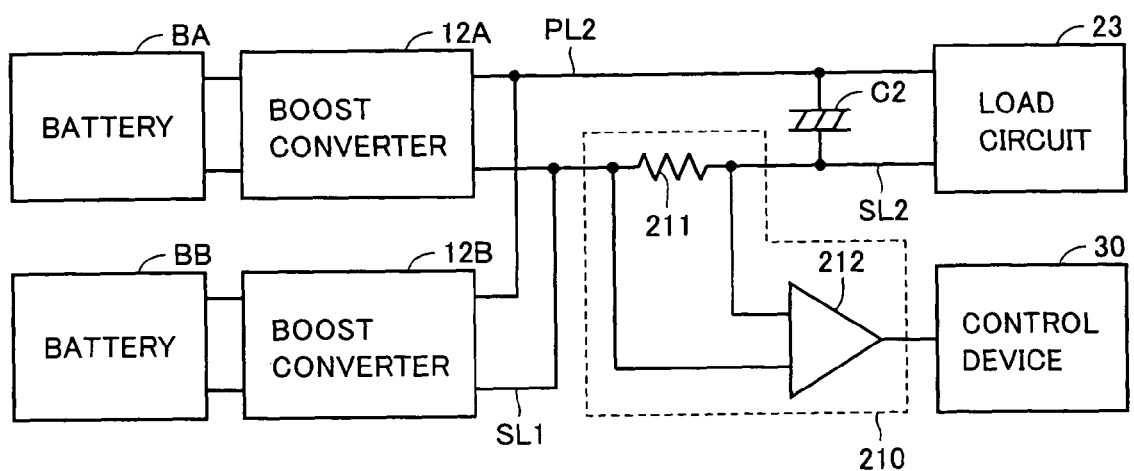
FIG. 7 is a block diagram of a configuration of a vehicle 200 according to a third embodiment.

FIG. 7 is a block diagram of a configuration of a vehicle 200 according to a third embodiment.

Referring to FIG. 7, vehicle 200 includes batteries BA and BB, boost converters 12A and 12B, capacitor C2, load circuit 23, a current sensor 210, and control device 30.

Although batteries BA and BB, boost converters 12A and 12B, capacitor C2, and load circuit 23 are shown in a simplified manner in FIG. 7, they have a configuration shown in FIG. 1, and therefore, the description thereof will not be repeated.

Current sensor 210 includes a shunt resistor 211, and an operational amplifier 212 amplifying a potential difference caused by a current flowing through shunt resistor 211. An output of operational amplifier 212 is sampled by control device 30.

Power supply lines PL2 from boost converters 12A and 12B are joined together and then connected to capacitor C2 and load circuit 23. Ground lines SL1 from boost converters 12A and 12B are joined together and then connected to one end of shunt resistor 211 within current sensor 210. The other end of shunt resistor 211 is connected to capacitor C2 and load circuit 23 via a ground line SL2.

Thus, in the third embodiment as well, one current sensor is provided closer to load circuit 23 than the junctions of the current paths extending from two boost converters 12A and 12B toward load circuit 23. Control device 30 reads two current values from one current sensor by controlling the carrier signals for driving two boost converters 12A and 12B such that they are shifted and by sampling an output of the current sensor with a time difference in accordance with the shift between the carrier signals.

Current sensor 210 including shunt resistor 211 is more inexpensive than a current sensor including a hall element. An output of such current sensor 210 is input to the control device implemented by an ECU driven by a battery voltage of usual auxiliary machinery. When current sensor 210 is provided on power supply line PL2, an insulated, expensive operational amplifier 212 is required because a difference between a battery voltage of the auxiliary machinery (for example, 12V) and a voltage of power supply line PL2 (for example, 200-600V) is large.

In comparison, as shown in FIG. 7, when current sensor 210 is provided on a side of the ground line, a difference between a battery voltage of the auxiliary machinery and a voltage of the ground line is not so large. Therefore, an inexpensive operational amplifier can be used and the vehicle cost can be reduced.

The present embodiment has been described based on an example in which the present invention is applied to a series/parallel-type hybrid system in which the power split device can split mechanical power of the engine so that the split power is transmitted to an axle and a generator. The present invention, however, can also be applied to a series-type hybrid vehicle using an engine only for the purpose of driving a generator and generating the driving force of an axle only by a motor that uses electric power generated by the generator, and an electric vehicle running by using only a motor.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A power supply device, comprising:
first and second power storage devices;
a first voltage converter provided between said first power storage device and a load circuit;
a second voltage converter provided between said second power storage device and said load circuit;
a first current path connected to an output of said first voltage converter;
a second current path connected to an output of said second voltage converter and connected to said first current path at a junction;
a third current path connected between said junction and said load circuit;
a current sensor detecting a current flowing through said third current path; and
a control device controlling said first and second voltage converters and monitoring a current value detected by said current sensor,
said control device performing pulse width modulation control over said first and second voltage converters based on first and second carrier signals equal in frequency and different in phase, and
said control device obtaining an individual value of currents flowing through said first and second voltage converters by sampling said detected current value with a time difference corresponding to said phase difference.

2. The power supply device according to claim 1, wherein said control device includes
a signal generating portion generating the first carrier signal,
a first modulating portion generating a first drive signal supplied to said first voltage converter based on a first command value and said first carrier signal,
a phase changing portion adding said phase difference to said first carrier signal and outputting said second carrier signal, and
a second modulating portion generating a second drive signal supplied to said second voltage converter based on a second command value and said second carrier signal.

3. The power supply device according to claim 2, wherein said phase difference is 180°.

4. The power supply device according to claim 2, wherein said phase changing portion adjusts said phase difference such that a timing of rising of said second drive signal matches a timing of falling of said first drive signal.

5. The power supply device according to claim 1, further comprising a capacitor having one end connected to a connection point on said third current path, for smoothing an output from said first voltage converter and an output from said second voltage converter and supplying the outputs to said load circuit, wherein
said current sensor detects a current flowing between said junction of said third current path and said connection point.

6. The power supply device according to claim 1, wherein each of said first and second voltage converters includes a chopper circuit.

7. A vehicle comprising:
a power supply device; and
an inverter driving a motor for driving wheels;
said power supply device including first and second power storage devices,
a first voltage converter provided between said first power storage device and said inverter,
a second voltage converter provided between said second power storage device and said inverter,
a first current path connected to an output of said first voltage converter,
a second current path connected to an output of said second voltage converter and connected to said first current path at a junction,
a third current path connected between said junction and said inverter,
a current sensor detecting a current flowing through said third current path, and
a control device controlling said first and second voltage converters and monitoring a current value detected by said current sensor,
said control device performing pulse width modulation control over said first and second voltage converters based on first and second carrier signals equal in frequency and different in phase, and
said control device obtaining an individual value of currents flowing through said first and second voltage converters by sampling said detected current value with a time difference corresponding to said phase difference.

8. The vehicle according to claim 7, wherein
said control device includes
a signal generating portion generating the first carrier signal,
a first modulating portion generating a first drive signal supplied to said first voltage converter based on a first command value and said first carrier signal,
a phase changing portion adding said phase difference to said first carrier signal and outputting said second carrier signal, and
a second modulating portion generating a second drive signal supplied to said second voltage converter based on a second command value and said second carrier signal.

9. The vehicle according to claim 8, wherein
said phase difference is 180°.

10. The vehicle according to claim 8, wherein
said phase changing portion adjusts said phase difference such that a timing of rising of said second drive signal matches a timing of falling of said first drive signal.

11. The vehicle according to claim 7, further comprising a capacitor having one end connected to a connection point on said third current path, for smoothing an output from said first voltage converter and an output from said second voltage converter and supplying the outputs to said inverter, wherein said current sensor detects a current flowing between said junction of said third current path and said connection point.

12. The vehicle according to claim 7, wherein each of said first and second voltage converters includes a chopper circuit.

* * * * *